US012803036B2

(12) United States Patent
Lim et al.

(10) Patent No.: US 12,803,036 B2
(45) Date of Patent: Nov. 17, 2026

(54) APPARATUS FOR MANUFACTURING ELECTRODE CELL AND METHOD FOR CONTROLLING THE SAME

(71) Applicant: LG Energy Solution, Ltd., Seoul (KR)

(72) Inventors: Bum Seung Lim, Daejeon (KR); Inn Whan Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 691 days.

(21) Appl. No.: 18/035,453

(22) PCT Filed: Jan. 4, 2022

(86) PCT No.: PCT/KR2022/000089
§ 371 (c)(1),
(2) Date: May 4, 2023

(87) PCT Pub. No.: WO2022/149830
PCT Pub. Date: Jul. 14, 2022

(65) Prior Publication Data
US 2023/0411669 A1 Dec. 21, 2023

(30) Foreign Application Priority Data
Jan. 8, 2021 (KR) ........................ 10-2021-0002901
Dec. 21, 2021 (KR) ........................ 10-2021-0184362

(51) Int. Cl.
*H01M 10/04* (2006.01)

(52) U.S. Cl.
CPC ... *H01M 10/0409* (2013.01); *H01M 10/0413* (2013.01)

(58) Field of Classification Search
CPC ............. H01M 10/04; H01M 10/0404; H01M 10/0409; H01M 10/0413; H01M 4/04; Y02E 60/10; Y02P 70/50
See application file for complete search history.

(56) References Cited

U.S. PATENT DOCUMENTS 8,333,147 B2 12/2012 Liao et al.
2010/0281685 A1 11/2010 Hori et al.
(Continued)

FOREIGN PATENT DOCUMENTS

CN 110168791 A 8/2019
CN 110352521 A 10/2019
(Continued)

OTHER PUBLICATIONS

Machine translation JP2004022206 (Year: 2004).*
(Continued)

*Primary Examiner* — Victoria H Lynch
(74) *Attorney, Agent, or Firm* — Lerner David LLP

(57) ABSTRACT

An apparatus for manufacturing an electrode cell is configured to manufacture the electrode cell by stacking and cutting a separator sheet and an electrode sheet. A method for controlling an apparatus for manufacturing an electrode cell includes: a first detection process of inspecting the electrode cell in real time or at a preset period while a process of manufacturing the electrode cell is performed; a second detection process of detecting an alignment of the electrode sheet and the separator sheet; and an output process of outputting information of a position at which abnormality of the alignment is detected in the second detection process when abnormality of the electrode cell is detected in the first detection process.

6 Claims, 8 Drawing Sheets

(56) References Cited

U.S. PATENT DOCUMENTS

| | | | |
|---|---|---|---|
| 2018/0166709 A1 | 6/2018 | Lee et al. | |
| 2019/0252729 A1 | 8/2019 | Fujiwake et al. | |
| 2019/0341658 A1* | 11/2019 | Han | H01M 10/052 |
| 2020/0067051 A1 | 2/2020 | Yamashita et al. | |
| 2020/0266459 A1 | 8/2020 | Lee et al. | |
| 2022/0131175 A1 | 4/2022 | Lee et al. | |
| 2023/0125899 A1 | 4/2023 | Kim et al. | |

FOREIGN PATENT DOCUMENTS

| | | | |
|---|---|---|---|
| CN | 108861535 B | | 9/2020 |
| EP | 4109613 A1 | | 12/2022 |
| JP | 2000182658 A | | 6/2000 |
| JP | 2004022206 A | * | 1/2004 |
| JP | 4716138 B2 | | 7/2011 |
| JP | 5279533 B2 | | 9/2013 |
| KR | 100696811 B1 | | 3/2007 |
| KR | 20100113111 A | | 10/2010 |
| KR | 101507015 B1 | | 3/2015 |
| KR | 101729161 B1 | | 4/2017 |
| KR | 20170094603 A | | 8/2017 |
| KR | 20180068796 A | | 6/2018 |
| KR | 101896383 B1 | | 9/2018 |
| KR | 101956758 B1 | | 3/2019 |
| KR | 20190113907 A | | 10/2019 |
| KR | 20190134068 A | | 12/2019 |
| KR | 20200058956 A | | 5/2020 |
| KR | 20200109042 A | | 9/2020 |
| KR | 102187450 B1 | | 12/2020 |
| KR | 102191183 B1 | | 12/2020 |
| KR | 102253132 B1 | | 5/2021 |
| KR | 20210071828 A | | 6/2021 |

OTHER PUBLICATIONS

International Search Report for PCT/KR2022/000089 mailed Apr. 12, 2022. 3 pages.

Extended European Search Report including Written Opinion for Application No. 22736807.3 dated Nov. 22, 2024. 9 pgs.

* cited by examiner

APPARATUS FOR MANUFACTURING ELECTRODE CELL AND METHOD FOR CONTROLLING THE SAME

CROSS-REFERENCE TO RELATED APPLICATIONS

The present application is a national phase entry under 35 U.S.C. § 371 of International Application No. PCT/KR2022/000089 filed on Jan. 4, 2022, which claims priority from Korean Patent Application Nos. 10-2021-0002901, filed on Jan. 8, 2021, and 10-2021-0184362, filed on Dec. 21, 2021, all of which are hereby incorporated herein by reference in their entireties.

FIELD

The present invention relates to an apparatus for manufacturing an electrode cell for a secondary battery and a method for controlling the same.

BACKGROUND

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary battery may be classified according to the structure of the electrode assembly having a positive electrode/separator/negative electrode structure. The stack type secondary battery has a structure in which electrodes, each of which is cut to a certain size, are sequentially stacked with a separator therebetween, and the winding type secondary battery has a structure in which electrodes, each of which is not cut, and a separator interposed between the electrodes are stacked to be wound at the same time.

Particularly, the stack type secondary battery may be manufactured by stacking a plurality of electrode cells, each of which is formed in a predetermined size. Therefore, it is important to uniformly maintain manufacturing quality of the electrode cells.

According to the related art, an operator manually monitors and adjusts an alignment of an electrode sheet and a separator sheet based on a laser line irradiated toward the electrode sheet and the separator sheet. However, this method has a problem in that the quality of the manufactured electrode cell varies according to individual deviations such as the skill level of the operator.

SUMMARY OF THE DISCLOSURE

An object to be achieved by the present invention is to provide an apparatus for manufacturing an electrode cell, which is capable of manufacturing electrode cells having uniform quality, and a method for controlling the same.

Another object to be achieved by the present invention is to provide an apparatus for manufacturing an electrode cell, which has an improved non-operational loss, and a method for controlling the same.

An apparatus for manufacturing an electrode cell according to an embodiment of the present invention may manufacture the electrode cell by stacking and cutting a separator sheet and an electrode sheet. A method for controlling an apparatus for manufacturing an electrode cell includes: a first detection process of inspecting the electrode cell in real time or at a preset period while a process of manufacturing the electrode cell is performed; a second detection process of detecting an alignment of the electrode sheet and the separator sheet; and an output process of outputting information of a position at which abnormality of the alignment is detected in the second detection process when abnormality of the electrode cell is detected in the first detection process.

The second detection process may be performed when the abnormality of the electrode cell is detected in the first detection process.

When the abnormality of the electrode cell is detected in the first detection process, the process of manufacturing the electrode cell may be stopped.

A plurality of sub-vision sensors performing the second detection process may include: a separator vision sensor detecting the alignment of the separator sheet unwound from a separator unwinder; an electrode vision sensor detecting the alignment of the electrode sheet unwound from an electrode unwinder; and an intermediate vision sensor detecting the alignment of an electrode that is bonded to the separator sheet by cutting the electrode sheet.

A plurality of sub-vision sensors performing the second detection process may be operated according to a preset order, and when the abnormality of the alignment is detected in one sub-vision sensor, an operation of the other sub-vision sensor, which is scheduled to be operated after operating the one sub-vision sensor, may be suspended.

An end vision sensor performing the first detection process may be disposed behind a separator cutter that cuts the separator sheet with respect to a moving direction of the separator sheet.

The method may further include: a check process of detecting the alignment of the electrode sheet and the separator sheet when a check command is input in a state in which the process of manufacturing the electrode cell is stopped; and an operation starting process starting the process of manufacturing the electrode cell when the alignment of the electrode sheet and the separator sheet is normal in the check process.

An apparatus for manufacturing an electrode cell according to an embodiment of the present invention may manufacture the electrode cell by stacking and cutting a separator sheet and an electrode sheet. An apparatus for manufacturing an electrode cell includes: an electrode cutter configured to cut the electrode sheet at a preset interval to form a plurality of electrodes spaced a predetermined distance from each other in a longitudinal direction of the separator sheet; a plurality of sub-vision sensors configured to detect an alignment of the separator sheet, the electrode sheet, or the electrodes; a rolling device configured to roll the electrodes and the separator sheet; a separator cutter configured to cut the separator sheet in a state in which the electrodes and the separator sheet are rolled; an end vision sensor configured to inspect the electrode cell; and an output interface configured to output information from an abnormality detection sensor, in which abnormality of an alignment is detected, among the plurality of sub-vision sensors when abnormality is detected in the end vision sensor.

The apparatus may further include a controller configured to stop the process of manufacturing the electrode cell when the abnormality is detected in the end vision sensor.

The apparatus may further include an input interface configured to receive an operator's input. The controller may operate the apparatus for manufacturing the electrode cell when a check command is input the input interface, and the alignment detected in the plurality of sub-vision sensor is normal in a state in which the process of manufacturing the electrode cell is stopped.

An apparatus for manufacturing an electrode cell includes: an electrode unwinder configured to mount an electrode roll thereon and unwind the electrode roll so as to unwind an electrode sheet; an electrode vision sensor configured to detect an alignment of the electrode sheet; a separator unwinder configured to mount a separator roll thereon and unwind the separator roll so as to unwind the separator sheet; a separator vision sensor configured to detect an alignment of the separator sheet; an electrode cutter configured to cut the electrode sheet at a preset interval to form a plurality of electrodes spaced a predetermined distance from each other in a longitudinal direction of the separator sheet; a rolling device configured to roll the electrodes and the separator sheet; an intermediate vision sensor configured to detect an alignment of the electrodes rolled on the separator sheet by the rolling device; a separator cutter configured to cut the separator sheet in the state in which the electrodes and the separator sheet are rolled to form the electrode cell; and an end vision sensor configured to inspect the electrode cell.

The apparatus may further include an output interface configured to output information of an abnormal detection sensor, in which abnormality of the alignment is detected, among the electrode vision sensor, the separator vision sensor, and the intermediate vision sensor when abnormality is detected in the end vision sensor during a process of manufacturing the electrode cell.

The apparatus may further include a controller configured to stop the process of manufacturing the electrode cell when the abnormality is detected in the end vision sensor during the process of manufacturing the electrode cell.

The electrode unwinder may include: a first electrode unwinder configured to unwind the electrode sheet in a direction parallel to the separator sheet; and a second electrode unwinder configured to unwind the electrode sheet in an oblique direction with respect to the separator sheet. The electrode vision sensor may include: a first electrode vision sensor configured to face the electrode sheet unwound from the first electrode unwinder; and a plurality of second electrode vision sensors configured to face the electrode sheet unwound from the second electrode unwinder and to be spaced apart from each other in the longitudinal direction of the electrode sheet unwound from the second electrode unwinder.

The electrode unwinder may further include a third electrode unwinder configured to unwind the electrode sheet in the oblique direction with respect to the separator sheet and to be disposed at an opposite side of the second electrode unwinder with respect to the electrode sheet unwound from the first electrode unwinder. The electrode vision sensor may further include a plurality of third electrode vision sensors configured to face the electrode sheet unwound from the third electrode unwinder and to be spaced apart from each other in the longitudinal direction of the electrode sheet unwound from the third electrode unwinder.

According to the preferred embodiment of the present invention, the end vision sensor may inspect the electrode cell in real time or at the preset period during the process of manufacturing the electrode cell. As a result, the quality of the electrode cell may be uniformly maintained.

In addition, when the abnormality of the electrode cell is detected during the process of manufacturing the electrode cell, the process of manufacturing the electrode cell may be stopped, and the positional information at which the abnormality of the alignment is detected may be output. As a result, the operator may immediately grasp whether the abnormality of the alignment occurs at any position during the process of manufacturing the electrode cell and thus may quickly perform the calibration. Therefore, the non-operational loss in the process of manufacturing the electrode cell may be reduced.

In addition, the detection of the alignment may be performed automatically by the sub-vision sensor instead of the manual manipulation. As a result, the quality of the electrode cell may be prevented from varying according to the individual deviations such as the skill level of the operator.

In addition, the alignment of the plurality of electrodes rolled on the separator sheet by the intermediate vision sensor as well as the alignment of the separator sheet and the electrode sheet may be detected.

In addition, when the check command is input in the state in which the process of manufacturing the electrode cell is stopped, and the alignment of the electrode sheet and the separator sheet is normal, the process of manufacturing the electrode cell may be started. As a result, the abnormality of the alignment, which may occur by the operator's electrode connection work or separator connection work, may be immediately detected.

DETAILED DESCRIPTION

Figure 1:
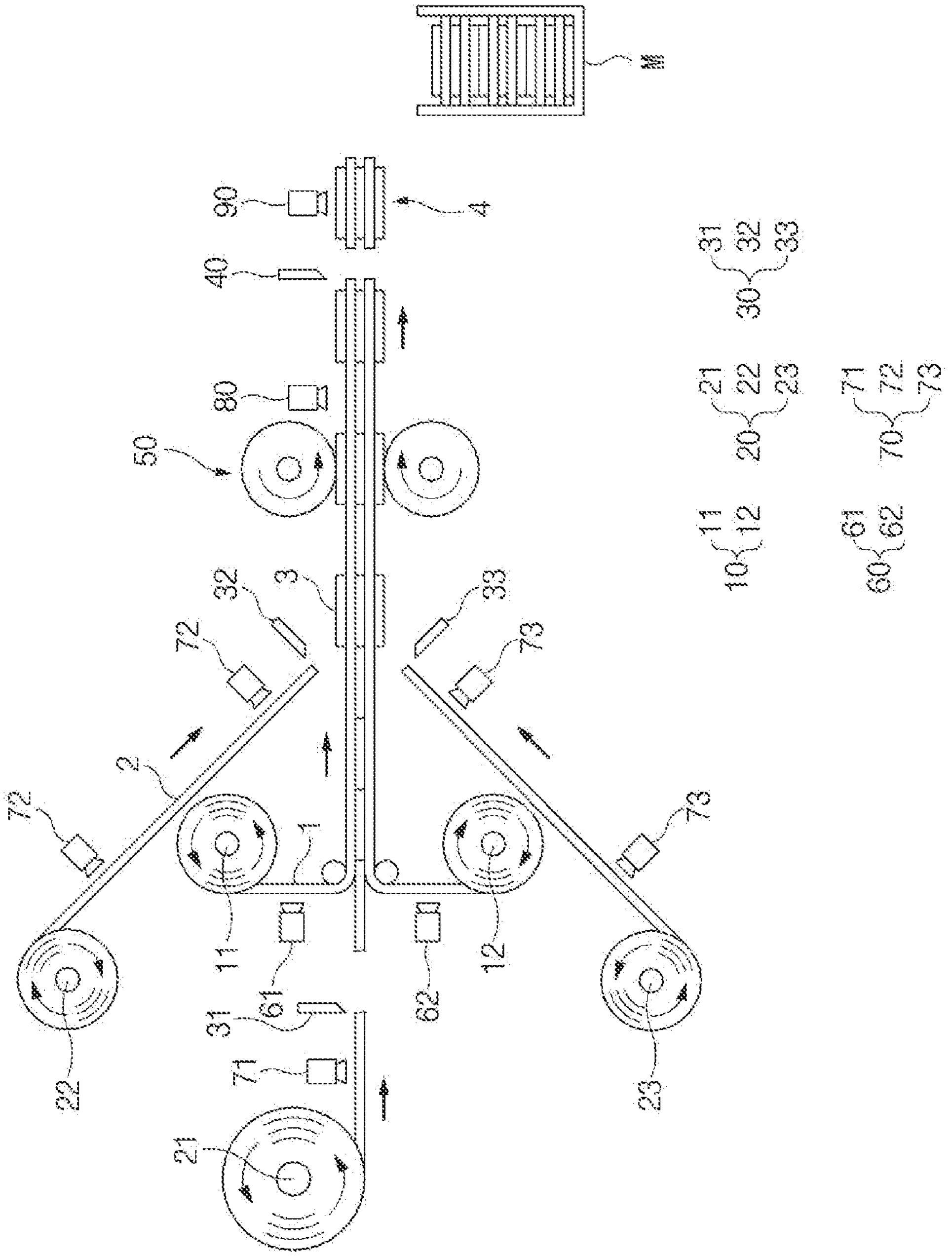
FIG. 1 is a schematic view illustrating an apparatus for manufacturing an electrode cell according to an embodiment of the present invention.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

FIG. 1 is a schematic view illustrating an apparatus for manufacturing an electrode cell according to an embodiment of the present invention.

An apparatus for manufacturing an electrode cell according to an embodiment of the present invention may manufacture an electrode cell 4 by stacking and cutting a separator sheet 1 and an electrode sheet 2.

In more detail, the apparatus for manufacturing the electrode cell may include a separator unwinder 10, an electrode unwinder 20, an electrode cutter 30, a separator cutter 40, and a rolling device 50.

A separator roll around which the separator sheet 1 is wound may be mounted on the separator unwinder 10. The separator unwinder 10 may unwind the separator roll to unwind the separator sheet 1. For example, the separator unwinder 10 may include a roller, on which the separator roll is mounted, and a motor allowing the roller to rotate.

The separator unwinder 10 may be provided in a pair to unwind a pair of separator sheets 1 that are parallel to each other. In more detail, the separator unwinder 10 may include a first separator unwinder 11 unwinding one separator sheet 1 and a second separator unwinder 12 unwinding the other separator sheet 1 parallel to the one separator sheet 1.

An electrode roll on which the electrode sheet 2 is wound may be mounted on the electrode unwinder 20. The electrode unwinder 20 may unwind the electrode roll to unwind the electrode sheet 2. For example, the electrode unwinder 20 may include a roller, on which the electrode roll is mounted, and a motor allowing the roller to rotate.

The electrode unwinder 20 may be provided in plurality. In more detail, the electrode unwinder 20 includes a first electrode unwinder 21 unwinding the electrode sheet 2 between the pair of separator sheets 1, a second electrode unwinder 22 unwinding the electrode sheet 2 toward an outer surface (e.g., a top surface) of the one separator sheet 1, and a third electrode unwinder 23 unwinding the electrode sheet 2 toward an outer surface (e.g., a bottom surface) of the other separator sheet 1.

With respect to the electrode sheet 2 unwound from the first electrode unwinder 21, the second electrode unwinder 22 and the third electrode unwinder 23 may be disposed opposite to each other.

Thus, the electrode sheet 2 unwound from the first electrode unwinder 21 may extend in a direction parallel to the separator sheet 1. On the other hand, the electrode sheet 2 unwound from the second electrode unwinder 22 and the third electrode unwinder 23 may extend in an oblique direction with respect to the separator sheet 1.

The electrode cutter 30 may form electrodes 3 by cutting the electrode sheet 2 at a predetermined interval.

The electrode cutter 30 may be provided in plurality, which cut the electrode sheets 2 unwound from the plurality of electrode unwinders 20. In more detail, the electrode cutters 30 may include a first electrode cutter 31 cutting the electrode sheet 2 unwound from the first electrode unwinder 21, a second electrode cutter 32 cutting the electrode sheet 2 unwound from the second electrode unwinder 22, and a third electrode cutter 33 cutting the electrode sheet 2 unwound from the third electrode unwinder 23.

The plurality of electrodes 3 respectively formed by the electrode cutters 30 may be disposed to be spaced a predetermined interval from each other in a longitudinal direction of the separator sheet 1.

The plurality of electrodes 3 formed by the first electrode cutter 31 may be disposed between the pair of separator sheets 1, the plurality of electrodes 3 formed by the second electrode cutter 32 may be disposed on the outer surface (e.g., the top surface) of the one separator sheet 1, and the plurality of electrodes 3 formed by the third electrode cutter 33 may be disposed on the outer surface (e.g., the bottom surface) of the other separator sheet 1. As a result, the electrode 3 and the separator sheet 1 may be alternately stacked.

The rolling device 50 may roll (laminate) the electrode 3 and the separator sheet 1 to each other. That is, the electrode 3 may be bonded to the separator sheet 1.

For example, the rolling device 50 may include a pair of heaters and a pair of rollers, which are spaced apart from each other with the electrode 3 and the separator sheet 1 therebetween. In this case, the pair of rollers may be disposed behind the pair of heaters with respect to a moving direction of the electrode 3 and the separator sheet 1. However, the present invention is not limited thereto, and it is also possible that the heater is provided in each of the pair of rollers.

The separator cutter 40 may form the electrode cell 4 by cutting the separator sheet 1 in a state in which the electrode 3 and the separator sheet 1 are rolled.

In more detail, the separator cutter 40 may be disposed behind the rolling device 50 with respect to the moving direction of the electrode 3 and the separator sheet 1 to cut an area between the plurality of electrodes 3 on the separator sheet 1.

As a result, the electrode cell 4 may have a configuration in which the electrodes and the separators are alternately stacked. As described above, a series of processes for forming the electrode cell 4 by the separator unwinder 10, the electrode unwinder 20, the electrode cutter 30, the rolling device 50, and the separator cutter 40 may be called a process of manufacturing an electrode cell.

The electrode cell 4 formed by the process of manufacturing the electrode cell may be stacked on a magazine M. However, when the separator sheets 1, the electrode sheets 2, or the electrodes 3 are misaligned in the process of manufacturing the electrode cell, the separator sheets 1, the electrode sheets 2, or the electrodes 3 are out of a preset path line to deteriorate quality of the electrode cell 4, thereby causing stack defects with respect to the magazine M.

Therefore, there is a need to monitor whether the separator sheet 1, the electrode sheet 2, or the electrode 3 are misaligned.

For this, the apparatus for manufacturing the electrode cell according to an embodiment of the present invention may include a plurality of sub-vision sensors 60, 70, and 80 and an end vision sensor 90. The end vision sensor 90 may be referred to as a main vision sensor.

Each of the plurality of sub-vision sensors 60, 70, and 80 and the end vision sensor 90 may include a camera.

The plurality of sub-vision sensors 60, 70, and 80 may be disposed in front of the separator cutter 40 with respect to the moving direction of the separator sheets 1, the electrode sheets 2, and the electrodes 3.

In more detail, the plurality of sub-vision sensors 60, 70, and 80 may include a separator vision sensor 60 detecting the alignment of the separator sheets 1, an electrode vision sensor 70 detecting the alignment of the electrode sheets 2, and an intermediate vision sensor 80 detecting the alignment of the electrodes 3 rolled on the separator sheets 2.

The separator vision sensor 60 may face the separator sheet 1 unwound from the separator unwinder 10 and may detect the alignment of the separator sheet 1. The separator vision sensor 60 may be disposed in front of a point, at which the electrode 3 is disposed on the separator sheet 1, with respect to the moving direction of the separator sheet 1.

The separator vision sensor 60 may be provided in plurality to detect the alignment of the separator sheet 1 unwound from each of the separator unwinders 10. In more detail, the separator vision sensor 60 may include a first separator vision sensor 61, which detects the alignment of the separator sheet 1 unwound from the first separator unwinder 11, and a second separator vision sensor 62, which detects the alignment of the separator sheet 1 unwound from the second separator unwinder 12.

The electrode vision sensor 70 may face the electrode sheet 2 unwound from the electrode unwinder 20 and may detect the alignment of the electrode sheet 2. The electrode vision sensor 70 may be disposed in front of the electrode cutter 30 with respect to the moving direction of the electrode sheet 2.

The electrode vision sensor 70 may be provided in plurality to detect the alignment of the electrode sheet 2 unwound from each of the electrode unwinders 20. In more detail, the electrode vision sensor 70 may include a first electrode vision sensor 71 that detects the alignment of the electrode sheet 2 unwound from the first electrode unwinder 21, a second electrode vision sensor 72 that detects the alignment of the electrode sheet 2 unwound from the second electrode unwinder 22, a third electrode vision sensor 73 that detects the alignment of the electrode sheet 2 unwound from the third electrode unwinder 23.

As described above, the electrode sheet 2 unwound from the second electrode unwinder 22 and the third electrode unwinder 23 may extend in an oblique direction with respect to the separator sheet 1. Accordingly, each of the electrode sheets 2 unwound from the second electrode unwinder 22 and the third electrode unwinder 23 have a length greater than that of the electrode sheet 2 unwound from the first electrode unwinder 21, and thus, a risk of misalignment may increase.

Thus, each of the second electrode vision sensor 72 and the third electrode vision sensor 73 may be provided in plurality, which are spaced apart from each other in the longitudinal direction of the electrode sheet 2.

For example, one second electrode vision sensor 72 may be disposed adjacent to the second electrode unwinder 22, and the other second electrode vision sensor 72 may be disposed adjacent to the second electrode cutter 32. In addition, one third electrode vision sensor 73 may be disposed adjacent to the third electrode unwinder 23, and the other third electrode vision sensor 73 may be disposed adjacent to the third electrode cutter 33.

The intermediate vision sensor 80 may be disposed between the rolling device 50 and the separator cutter 40 in the moving direction of the separator sheet 1 and the electrode 3.

The intermediate vision sensor 80 may be disposed to face the electrode 3 rolled on the separator sheet 1 by the rolling device 50, thereby detecting the alignment of the electrode 3. The intermediate vision sensor 80 may detect not only the alignment of the electrode 3 but also the alignment of the separator sheet 1 on which the electrode 3 is rolled.

The end vision sensor 90 may be disposed to face the electrode cell 4 and may inspect the electrode cell 4. Hereinafter, the case in which the end vision sensor 90 detects an alignment of the electrode cell 4 will be described as an example, but the present invention is not limited thereto.

The end vision sensor 90 may be disposed behind the separator cutter 40 in the moving direction of the electrode cell 4.

Figure 2:
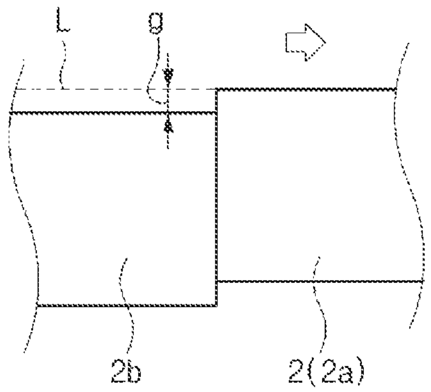
FIG. 2 is a view of portions of existing and new electrode sheets relative to a virtual line for explaining one example of a method for detecting an alignment through an electrode vision sensor illustrated in FIG. 1.

FIG. 2 is a view of portions of existing and new electrode sheets relative to a virtual line for explaining one example of a method for detecting an alignment through an electrode vision sensor illustrated in FIG. 1.

When all existing electrode rolls 2 mounted on an electrode unwinder 20 are unwound, an operator may mount a new electrode roll on the electrode unwinder 20, and an existing electrode sheet 2*a*, on which the existing electrode roll is unwound, and a new electrode sheet 2*b*, on which the new electrode roll is unwound, may be connected to each other. That is, the operator may perform a connection operation of the electrode sheets 2.

In this case, an electrode vision sensor 70 may measure a height difference g between the existing electrode sheet 2*a* and the new electrode sheet 2*b* in a width direction, and when the height difference g is out of a preset range, it may be determined that abnormality of the alignment occurs.

In addition, the electrode vision sensor 70 may set a virtual line L extending in a longitudinal direction of the electrode sheet 2, and an alignment mark (not shown) displayed on an edge of the electrode sheet 2 or the electrode sheet 2 may be compared to the virtual line L. The electrode vision sensor 70 may determine that the alignment of the electrode sheet 2 is abnormal when the edge or the alignment mark of the electrode sheet 2 is out of a predetermined range or is misaligned with respect to the virtual line L.

As a result, those skilled in the art will also be able to easily understand a method for detecting the alignment with respect to the separator sheet 1 through the separator vision sensor 60.

Figure 3:
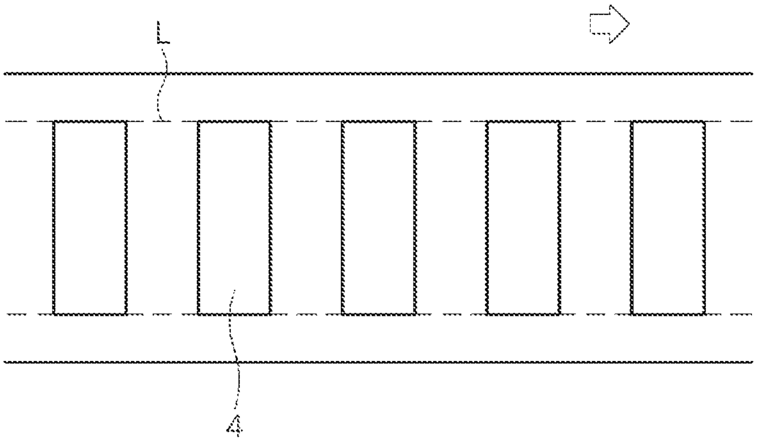
FIG. 3 is a view of electrode cells relative to a virtual line for explaining one example of a method for detecting an alignment through an end vision sensor illustrated in FIG. 1.

FIG. 3 is a view of electrode cells relative to a virtual line for explaining one example of a method for detecting the alignment through an end vision sensor illustrated in FIG. 1.

The end vision sensor 90 may set the virtual line L extending in the moving direction of the electrode cell 4, and an alignment mark (not shown) displayed on an edge of the electrode cell 4 or the electrode cell 4 may be compared to the virtual line L. The end vision sensor 90 may determine that the alignment of the electrode cell 4 is abnormal when the edge or the alignment mark of the electrode cell 4 is out of a predetermined range or is misaligned with respect to the virtual line L.

As a result, those skilled in the art will also be able to easily understand a method for detecting the alignment with respect to the electrode 3 through the intermediate vision sensor 80.

Figure 4:
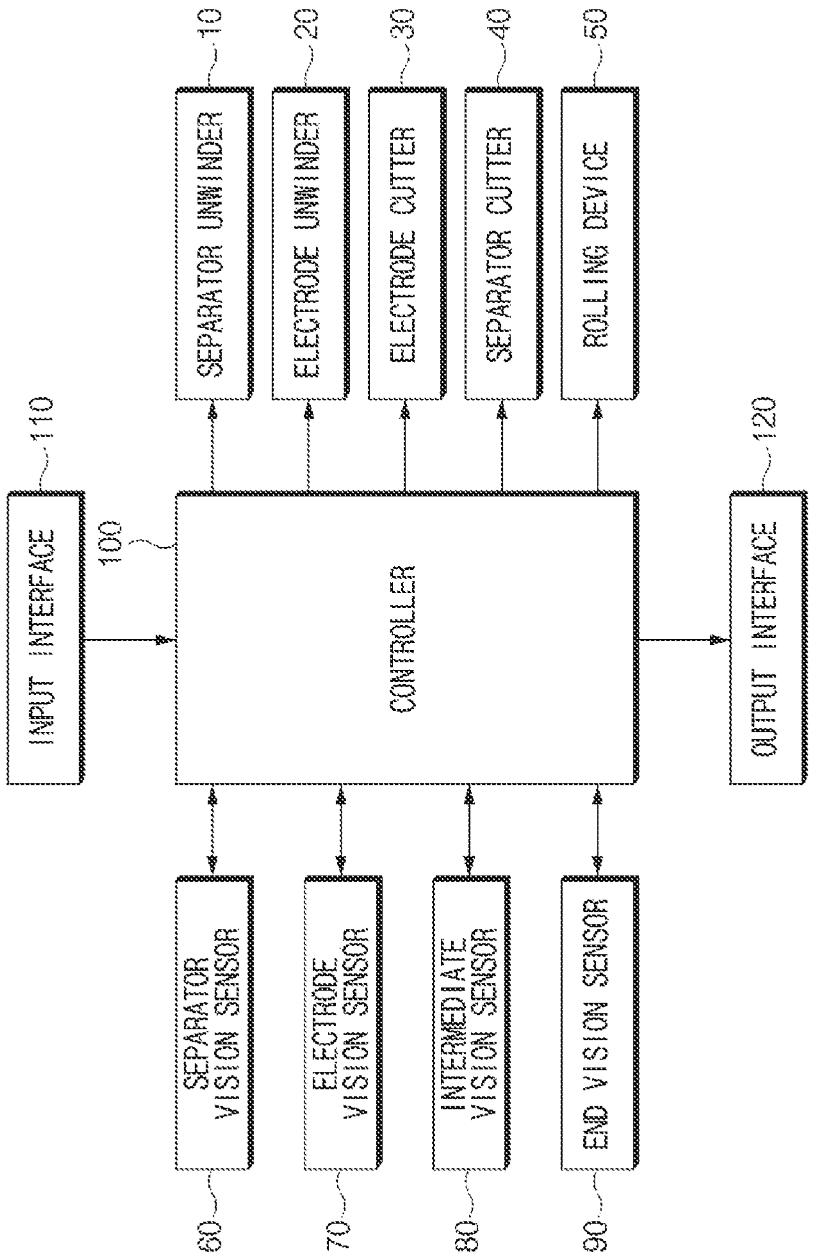
FIG. 4 is a control block diagram illustrating the apparatus for manufacturing the electrode cell according to another embodiment of the present invention.

FIG. 4 is a control block diagram illustrating the apparatus for manufacturing the electrode cell according to an embodiment of the present invention.

The apparatus for manufacturing the electrode cell according to an embodiment of the present invention may further include a controller 100, an input interface 110, and an output interface 120.

The controller 100 may include at least one processor.

The controller 100 may communicate with the sub-vision sensors 60, 70, and 80 and the end vision sensor 90 to an operation of each of the vision sensors 60, 70, 80, and 90 and receive image information detected by each of the vision sensors 60, 70, 80, and 90.

In addition, the controller 100 may control operations of the separator unwinder 10, the electrode unwinder 20, the electrode cutter 30, the separator cutter 40, and the rolling device 50.

The input interface 110 may receive a user's command, and a configuration thereof is not limited. For example, the input interface 110 may include at least one of a button, a switch, a knob, a microphone, a touch screen, and a keyboard.

The output interface 120 may output information related to the apparatus for manufacturing the electrode cell, and a configuration thereof is not limited. For example, the output interface 120 may include at least one of a display and a speaker.

The input interface 110 and the output interface 120 may communicate with the controller 100. Thus, the controller 100 may receive the command input through the input interface 110 and may output information related to the apparatus for manufacturing the electrode cell to the output interface 120.

Figure 5:
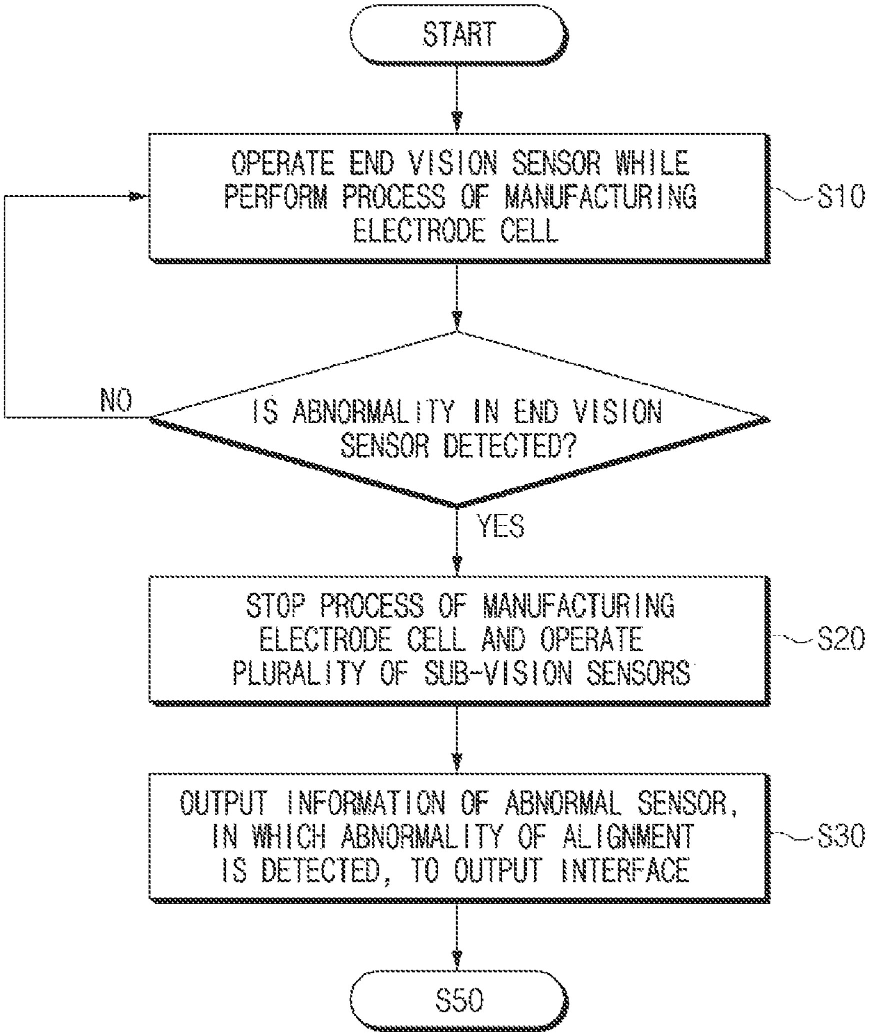
FIGS. 5 and 6 are flowcharts illustrating a method for controlling an apparatus for manufacturing an electrode cell according to another embodiment of the present invention.
Figure 6:
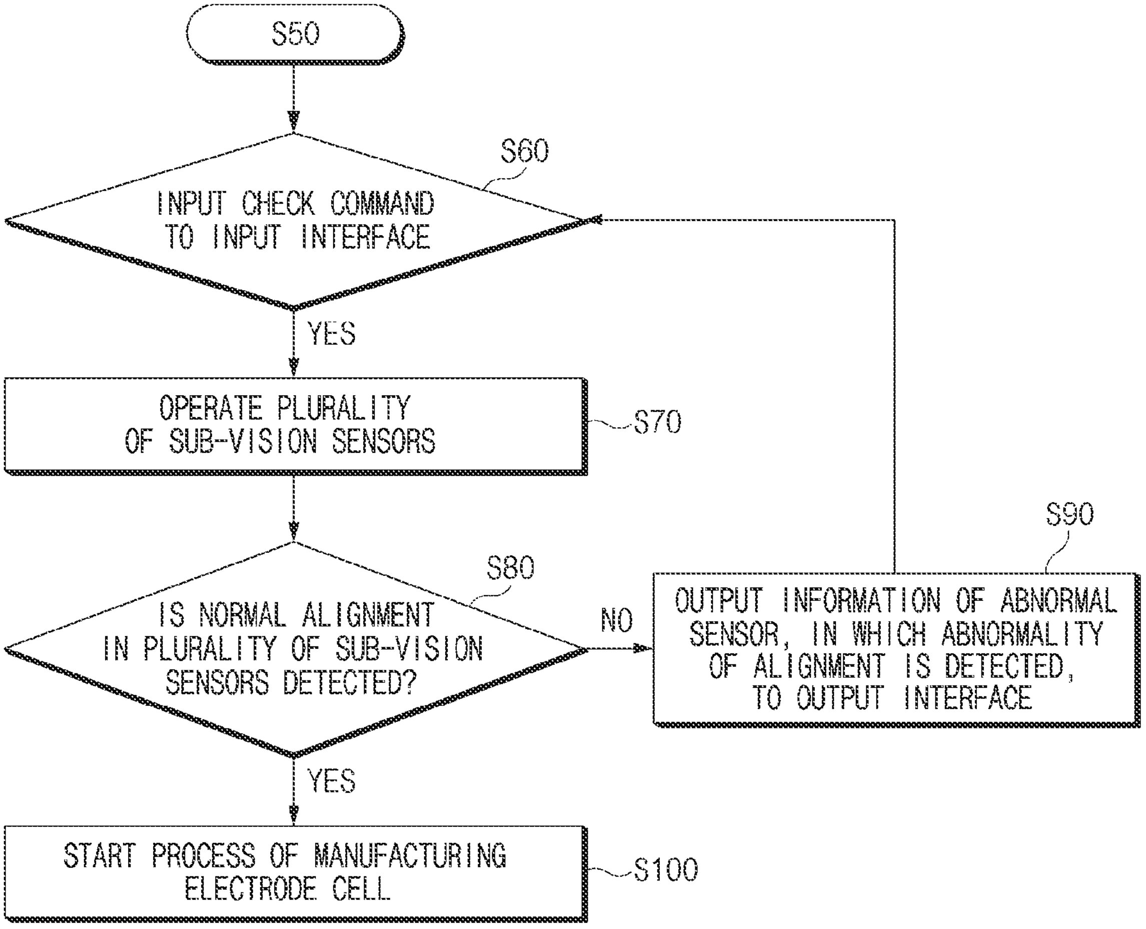

FIGS. 5 and 6 are flowcharts illustrating a method for controlling an apparatus for manufacturing an electrode cell according to an embodiment of the present invention.

A method for controlling an apparatus for manufacturing an electrode cell according to an embodiment of the present invention may include a first detection process (S10) of inspecting an electrode cell 4 in real time or at a preset period while a process of manufacturing the electrode cell is performed.

In more detail, the controller 100 may perform a process of manufacturing the electrode cell and operate the end vision sensor 90. That is, the controller 100 may operate a separator unwinder 10, an electrode unwinder 20, an electrode cutter 30, a separator cutter 40 and a rolling device 50, and thus, the electrode cell 4 may be manufactured. The controller 100 may control the end vision sensor 90 so that the end vision sensor 90 inspects the electrode cell in real time or at a preset period while the process of manufacturing the electrode cell is performed.

In addition, when a first detection process (S10) is performed, the controller 100 may inactivate the sub-vision sensors 60, 70, and 80. This is because the process of manufacturing the electrode cell is started only when abnormality of an alignment is not detected in the sub-vision sensors 60, 70, and 80. That is, when the process of manufacturing the electrode cell is already being performed, there is high possibility of a state in which the alignment of the separator sheet 1, the electrode sheet 2 and the plurality of electrodes 3 is maintained. Thus, there is an advantage in that the control of the first detection process (S10) is simplified.

The method for controlling the apparatus for manufacturing the electrode cell may include a second detection process (S20) of detecting the alignment of the electrode sheet 2 and the separator sheet 1.

In more detail, the controller 100 may stop the process of manufacturing the electrode cell when the abnormality of the alignment is detected in the end vision sensor 90. That is, the controller 100 may stop the separator unwinder 10, the electrode unwinder 20, the electrode cutter 30, the separator cutter 40, and the rolling device 50, and as a result, movement of the separator sheet 1, the electrode sheet 2, and the plurality of electrodes 3 are stopped, and thus, the manufacturing of the electrode cell 4 may be stopped.

In this state, the controller 100 may activate the plurality of sub-vision sensors 60, 70, and 80. That is, the second detection process (S20) may be performed when the abnormality of the electrode cell is detected in the first detection process (S10). Thus, the controller 100 may automatically determine a position at which the abnormality of the alignment, which causes the problem in the electrode cell 4, occurs during the process of manufacturing the electrode cell.

The method for controlling the apparatus for manufacturing the electrode cell may include an output process (S30) of outputting information of a position at which the abnormality of the alignment is detected.

In more detail, the controller 100 may designate the sub-vision sensors 60, 70, and 80, which detect the abnormality of the alignment among the plurality of sub-vision sensors 60, 70, and 80 as the abnormality detection sensor and may output the information of the position, at which the abnormality of the alignment is detected, to the output interface 120. The position information may include at least one of recognition information of the abnormality detection sensor and information on a detection target of the abnormality detection sensor.

The operator may immediately determine whether the abnormality of the alignment occurs at any position of any one of the separator sheet 1, the electrode sheet 2, and the electrode 3 through the position information output to the output interface 120 and perform calibration for solving the abnormality of the alignment.

Therefore, since the operator quickly performs the calibration, it is possible to reduce a non-operational loss of the process of manufacturing the electrode cell.

The method for controlling the apparatus for manufacturing the electrode cell may include a check process (S70) of detecting the alignment of the electrode sheet 2 and the separator sheet 1 when a check command is input in a state in which the process of manufacturing the electrode cell is stopped (S60).

After performing the calibration (S50), the operator may input the check command through the input interface 110 before restarting the process of manufacturing the electrode cell (S60), the check process (S70) for inspecting the alignment of the separator sheet 1, the electrode sheet 2, and the plurality of electrodes 3 may be performed.

In more detail, when the check command is input through the input interface 110 while the process of manufacturing the electrode cell is stopped, the controller 100 may operate the plurality of sub-vision sensors 70, 80, and 90.

In addition, even if a command to start the process of manufacturing the electrode cell is input through the input interface 110 while the process of manufacturing the electrode cell is stopped, the controller 100 may automatically operate the plurality of sub-vision sensors 70, 80, and 90.

Thus, it is possible to check whether the alignment of the separator sheet 1 and the electrode sheet 2 is in a normal state before the process of manufacturing the electrode cell is started.

If the abnormality of the alignment is detected in at least one of the plurality of sub-vision sensors 60, 70, and 80, similarly to the above-described output process (S30), the controller 100 may designate the sub-vision sensors 60, 70, and 80, which detect the abnormality of the alignment among the plurality of sub-vision sensors 60, 70, and 80 as the abnormality detection sensor and may output the information of the position, at which the abnormality of the alignment is detected, to the output interface 120 (S80 and S90). In this case, the operator may perform the calibration for solving the abnormality of the alignment, and thereafter, the check process (S70) may be performed again by re-inputting the check command through the input interface 110.

Although the case in which the check process S70 is performed after the output process S30 is illustrated in FIGS. 5 and 6, the present invention is not limited thereto.

For example, when all of existing electrode rolls mounted on the electrode unwinder 20 are unwound, the process of manufacturing the electrode cell may be automatically stopped, or an operator may stop the process of manufacturing the electrode cell through the input interface. In this case, the operator mounts a new electrode roll on the electrode unwinder 20 and may perform an electrode connection process of connecting the existing electrode sheet 2*a* (see FIG. 2), in which the existing electrode roll is unwound, to a new electrode sheet, in which the new electrode roll 2*b* is unwound. The checking process (S70) may be performed thereafter.

For another example, when all of existing separator rolls mounted on the separator unwinder 10 are unwound, the process of manufacturing the electrode cell may be automatically stopped, or an operator may stop the process of manufacturing the electrode cell through the input interface. In this case, the operator may mount a new separator roll on the separator unwinder 10 and may perform a separator connection process of connecting an existing separator sheet, in which the existing separator roll is unwound, to a new separator sheet, in which the new separator roll is unwound. The checking process (S70) may be performed thereafter.

The method for controlling the apparatus for manufacturing the electrode cell may include an operation starting process (S100) of starting the process of manufacturing the electrode cell when the alignment of the electrode sheet 1 and the separator sheet 1 is normal (S80) in the checking process (S70).

In more detail, if no abnormality of the alignment is detected in all of the plurality of sub-vision sensors 60, 70, and 80, the controller 100 may operate a separator unwinder 10 an electrode unwinder 20, an electrode cutter 30, a separator cutter 40 and a rolling device 50 and thus, the electrode cell 4 may be manufactured. At the same time, the controller 100 may activate an end vision sensor 90. That is, the first detection process (S10) described above may be performed.

Figure 7:
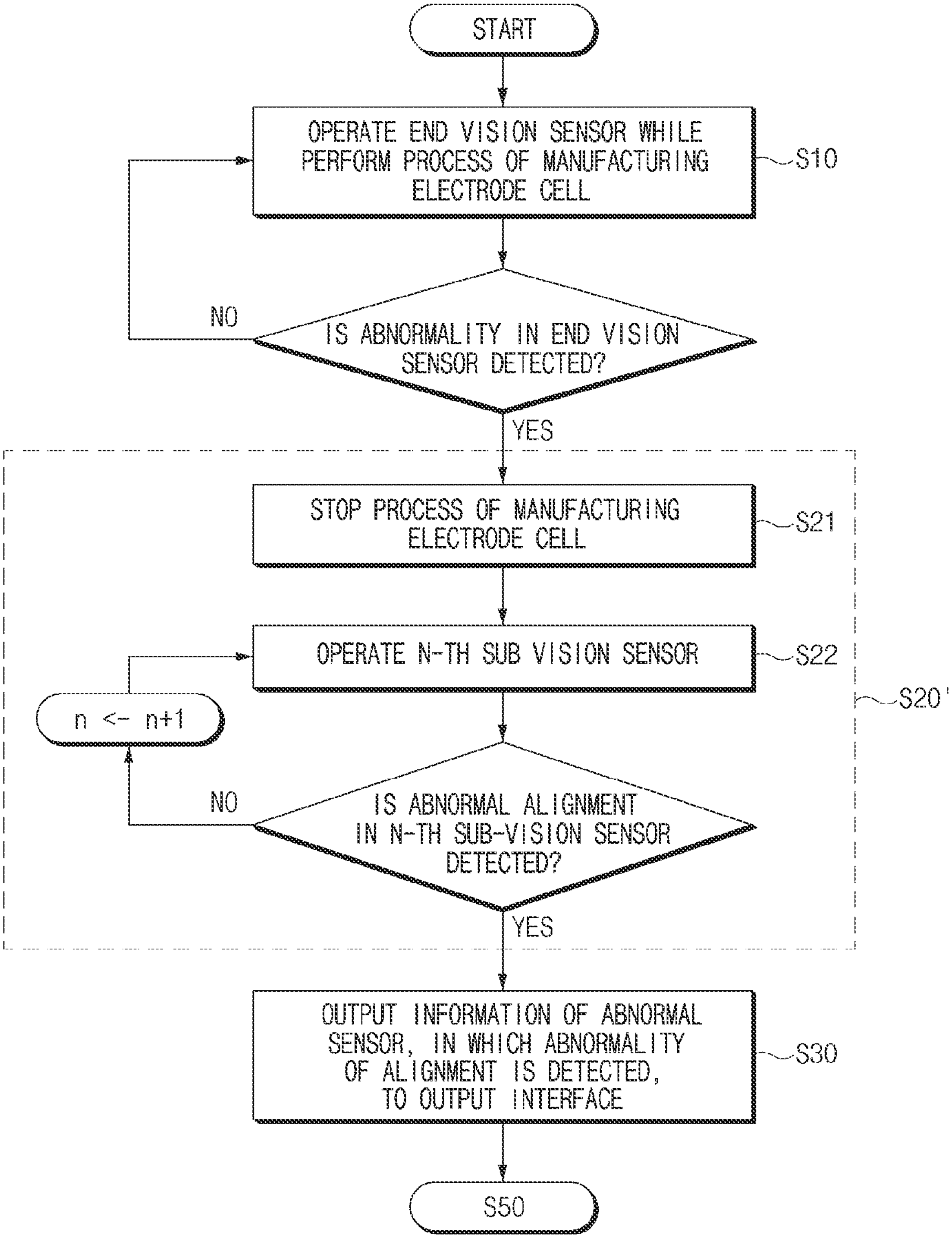
FIG. 7 is a flowchart illustrating a method for controlling an apparatus for manufacturing an electrode cell according to another embodiment of the present invention.

FIG. 7 is a flowchart illustrating a method for controlling an apparatus for manufacturing an electrode cell according to another embodiment of the present invention.

Since the method for controlling the apparatus for manufacturing the electrode cell according to the present embodiment is the same as the above-described contents except for a second detection process (S20'), duplicated contents are cited, and the description will be focused on differences.

In the second detection process (S20'), a controller 100 may stop a process of manufacturing the electrode cell when abnormality of an alignment is detected by an end vision sensor 90 in a first detection process (S10) (S21). That is, the controller 100 may stop a separator unwinder 10, an electrode unwinder 20, an electrode cutter 30, a separator cutter 40, and a rolling device 50, and as a result, movement of a separator sheet 1, an electrode sheet 2, and a plurality of electrodes 3 are stopped, and thus, the manufacturing of an electrode cell 4 may be stopped.

In this state, a plurality of sub-vision sensors 60, 70, and 80 are operated according to a preset order, and when the abnormality of the alignment is detected in one of the sub-vision sensors 60, 70, and 80, an operation of other vision sensors 60, 70, and 80, which is scheduled to be operated after operating one of the vision sensors 60, 70, and 80 may be suspended.

In more detail, the controller 100 may operate the plurality of sub-vision sensors 60, 70, and 80 according to a preset order (S22). For example, when the number of plurality of sub-vision sensors 60, 70, and 80 is M (M is a natural number greater than or equal to 3), the plurality of sub-vision sensors 60, 70, and 80 may be designated according to an operation order of the first sub-vision sensor, the second sub-vision sensor, . . . , and the M-th sub-vision sensor.

The controller 100 may operate an (n+1)-th sub-vision sensor when the abnormality of the alignment is not detected in the n-th sub-vision sensor (n is a natural number less than M).

On the other hand, when the abnormality of the alignment is detected in the n-th sub-vision sensor, the controller 100 may suspend the operation of the (n+1)-th sub-vision sensor to the M-th sub-vision sensor and perform the output process (S30). In this case, the controller 100 may designate the n-th sub-vision sensor as an abnormality detection sensor and output at least one of recognition information from the abnormality detection sensor or information on an object to be detected from the abnormality detection sensor to the output interface 120.

As a result, the control of the second detection process (S20') may be performed more efficiently.

Figure 8:
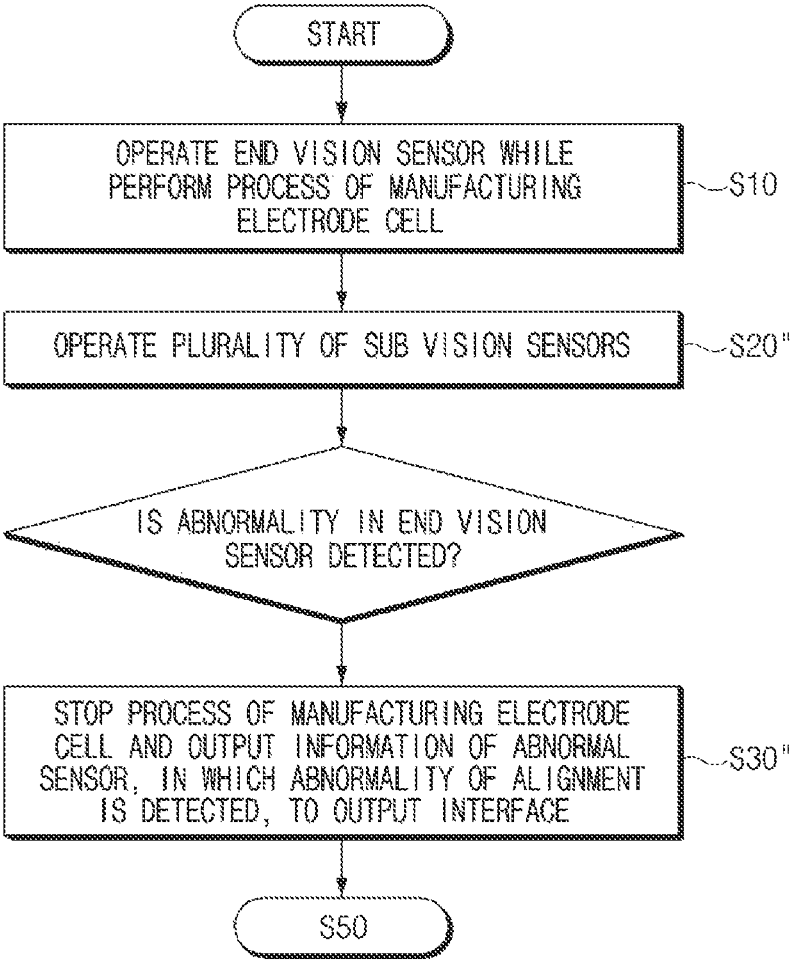
FIG. 8 is a flowchart illustrating a method for controlling an apparatus for manufacturing an electrode cell according to another embodiment of the present invention.

FIG. 8 is a flowchart illustrating a method for controlling an apparatus for manufacturing an electrode cell according to further another embodiment of the present invention.

Hereinafter, contents duplicated with the previously described contents will be cited, and described with a focus on the differences.

A method for controlling the apparatus for manufacturing the electrode cell according to the present embodiment may perform a second detection process (S20") regardless of whether abnormality is detected by an end vision sensor 90. In more detail, the second detection process (S20") of detecting an alignment of an electrode sheet 2 and a separator sheet 1 may be performed together with a first detection process (S10) while the process of manufacturing the electrode cell is performed. Although it is illustrated that the first detection process and the second detection process are sequentially performed in FIG. 8, the present invention is not limited thereto. The second detection process (S20") may be performed in real time or at a preset period while the process of manufacturing the electrode cell is being performed.

In more detail, a controller 100 may operate an end vision sensor 90 and a sub-vision sensors 60, 70, and 80 while performing the process of manufacturing the electrode cell.

In addition, when the end vision sensor 90 detects the abnormality in the electrode cell, an output process (S30") may be performed. In more detail, the controller 100 may stop the process of manufacturing the electrode cell when the abnormality of the alignment is detected by the end vision sensor 90 and may output information of a position at which the abnormality of the alignment is detected in the second detection process (S20").

An operator may immediately determine whether the abnormality of the alignment occurs at any position of any one of a separator sheet 1, an electrode sheet 2, and an electrode 3 through the position information output to an output interface 120 and perform calibration for solving the abnormality of the alignment.

In this embodiment, since the alignment of the electrode sheet 2 and the separator sheet 1 is detected in advance by a plurality of sub-sensors 60, 70, and 80, when the abnormality is detected by the end vision sensor 90, there is an advantage that the output process (S30") is performed quickly.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

[Description of the Symbols]

| | |
|---|---|
| 10: Separator unwinder | 20: Electrode unwinder |
| 30: Electrode cutter | 40: Separator cutter |
| 50: Rolling device | 60: Separator vision sensor |
| 70: Electrode vision sensor | 80: Intermediate vision sensor |
| 90: End vision sensor | 100: Controller |
| 110: Input interface | 120: Output interface |

The invention claimed is:

1. A method for controlling an apparatus for manufacturing an electrode cell, the apparatus being configured to stack portions of a separator sheet and an electrode sheet to manufacture the electrode cell, the method comprising:

inspecting, in a cell abnormality detection process, the electrode cell in real time or at a preset period during a cell manufacturing process for manufacturing the electrode cell;

detecting, in a sheet alignment detection process, an alignment of the electrode sheet and the separator sheet during the cell manufacturing process, the sheet alignment detection process being performed by sub-vision sensors operating according to a preset order, each of the sub-vision sensors being configured to detect a misalignment of the electrode and the separator sheets;

outputting information, via a processor, of a position at which the misalignment of the electrode and the separator sheets is detected in the sheet alignment detection process when an abnormality of the electrode cell is detected in the cell abnormality detection process;

performing calibration for solving the abnormality of the alignment; and after performing the calibration, inputting a check command before restarting the process for manufacturing the electrode cell, wherein when the misalignment of the electrode and the separator sheets is detected in one of the sub-vision sensors, an operation of another of the sub-vision sensors, which is scheduled to be operated after operating the one of the sub-vision sensors, is suspended, and wherein the sub-vision sensors comprise an electrode vision sensor configured to detect the alignment of the electrode sheet unwound from an electrode unwinder, the electrode vision sensor located between the electrode unwinder and a rolling device configured to laminate the electrode and the separator sheets to each other.

2. The method of claim 1, wherein the sheet alignment detection process is performed when the abnormality of the electrode cell is detected in the cell abnormality detection process.

3. The method of claim 1, further comprising, when the abnormality of the electrode cell is detected in the cell abnormality detection process, stopping the cell manufacturing process.

4. The method of claim 1, wherein the sub-vision sensors comprise:

a separator vision sensor configured to detect the alignment of the separator sheet unwound from a separator unwinder; and an intermediate vision sensor configured to detect the alignment of an electrode that is bonded to the separator sheet by cutting the electrode sheet.

5. The method of claim 1, wherein the cell abnormality detection process is performed by an end vision sensor disposed behind a separator cutter that cuts the separator sheet with respect to a moving direction of the separator sheet.

6. The method of claim 1, further comprising:

detecting, in a check process, the alignment of the electrode sheet and the separator sheet when a check command is input in a state in which the cell manufacturing process is stopped; and starting, in an operation starting process, the cell manufacturing process when the alignment of the electrode sheet and the separator sheet is normal in the check process.

* * * * *